(12) United States Patent
Wang

(10) Patent No.: US 10,992,522 B2
(45) Date of Patent: Apr. 27, 2021

(54) NETWORK CONFIGURATION METHOD AND NETWORK DEVICE

(71) Applicant: China Academy of Telecommunications Technology, Beijing (CN)

(72) Inventor: Hucheng Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 30 days.

(21) Appl. No.: 16/326,534

(22) PCT Filed: Jun. 5, 2017

(86) PCT No.: PCT/CN2017/087205
§ 371 (c)(1),
(2) Date: Feb. 19, 2019

(87) PCT Pub. No.: WO2018/032862
PCT Pub. Date: Feb. 22, 2018

(65) Prior Publication Data
US 2019/0207811 A1 Jul. 4, 2019

(30) Foreign Application Priority Data
Aug. 19, 2016 (CN) .......................... 201610697386.5

(51) Int. Cl.
*H04L 12/24* (2006.01)
*H04W 8/08* (2009.01)

(52) U.S. Cl.
CPC ...... *H04L 41/0803* (2013.01); *H04L 41/0806* (2013.01); *H04L 41/0853* (2013.01); *H04W 8/08* (2013.01)

(58) Field of Classification Search
CPC ... H04L 67/10; H04L 69/329; H04L 65/1069; G06F 16/954; G06F 21/10
See application file for complete search history.

(56) References Cited

U.S. PATENT DOCUMENTS

| 2007/0167182 | A1 | 7/2007 | Tenhunen et al. | |
| 2008/0032695 | A1* | 2/2008 | Zhu | H04W 36/0022 455/442 |

(Continued)

FOREIGN PATENT DOCUMENTS

| CN | 101155195 A | 4/2008 |
| CN | 101232699 A | 7/2008 |

(Continued)

OTHER PUBLICATIONS

3rd Generation Partnership Project: "Technical Specification Group Services and System Aspects", Study on Architecture for Next Generation System (Release 14), 3GPP Standard, 3GPP TR 23.799, 3rd Generation Partnership Project (3GPP), Mobile Competence Centre, 650, Route des Lucioles, F-06921 Sophia-Antipolis Cedex, France, vol. SA WG2, No. V0.7.0, Aug. 5, 2016 (Aug. 5, 2016), pp. 1-322, XP051172367, [retrieved on Aug. 5, 2016].

*Primary Examiner* — Jung H Park
(74) *Attorney, Agent, or Firm* — Foley & Lardner LLP

(57) ABSTRACT

Disclosed are a network configuration method and a network device for dynamically selecting a mobility state machine and a tunnel type matching a terminal and increasing resource utilization efficiency. The method comprises: when a terminal accesses a network, determining an attribute of the terminal; determining, on the basis of the attribute of the terminal, a configuration parameter corresponding to the terminal; and directing or configuring, on the basis of the configuration parameter, the terminal and/or directing or configuring a related network function entity or node at a network side.

16 Claims, 5 Drawing Sheets

(56) References Cited

U.S. PATENT DOCUMENTS

| | | | |
|---|---|---|---|
| 2009/0170475 A1* | 7/2009 | Ch'ng | H04W 12/0013 455/411 |
| 2012/0263083 A1 | 10/2012 | Zhou et al. | |
| 2019/0069327 A1* | 2/2019 | Kim | H04W 76/10 |
| 2019/0141169 A1* | 5/2019 | Ni | H04L 69/24 |

FOREIGN PATENT DOCUMENTS

| | | |
|---|---|---|
| CN | 101772186 A | 7/2010 |
| CN | 102118796 | 7/2011 |
| EP | 3 002 922 A1 | 4/2016 |
| WO | WO-02/067617 A1 | 8/2002 |
| WO | WO2011117823 A1 | 9/2011 |
| WO | WO-2016/073361 A1 | 5/2016 |
| WO | WO-2016/112966 A1 | 7/2016 |

\* cited by examiner

NETWORK CONFIGURATION METHOD AND NETWORK DEVICE

This application is a US National Stage of International Application No. PCT/CN2017/087205, filed on Jun. 5, 2017, designating the United States, and claiming the benefit of Chinese Patent Application No. 201610697386.5, filed with the Chinese Patent Office on Aug. 19, 2016, and entitled "A method for configuring a network, and a network device", which is hereby incorporated by reference in its entirety.

FIELD

The present application relates to the field of communications, and particularly to a method for configuring a network, and a network device.

BACKGROUND

I. An introduction to a demand for a support of on-demand mobility in the 3$^{rd}$ Generation Partnership Project (3GPP) Technical Report (TR) 22.891.

As described in the 3GPP TR 22.891, a support of on-demand mobility shall be provided in a future 5G network because there are different communication scenarios in the 5G network: there are different mobile modes of different User Equipments (UEs), and for example, some UEs access the network while moving at a high speed, and some UEs access the network nomadically or statically; and there are also different mobility support requirements in different traffic, and for example, an interruption and a packet loss ratio in some traffic are required to be alleviated and lowered while the traffic is being transmitted, so the network shall hide a mobility event from an application layer, and for example, keep an Internet Protocol (IP) address unchanged during a handover, but some other application can support traffic continuity through the application layer. In view of this, a support of on-demand mobility is proposed in the 3GPP.

II. An introduction to a state machine of a UE.

Both a universal state model for state machines of all the UEs, and different state machine models of different UEs, e.g., the power saving state of a UE in a power-saving mode, and a simplified state machine model of an immobile UE, are proposed in the existing TR 23.799. The universal state model in an Evolved Packet System (EPS) system is as illustrated in FIG. 1 and FIG. 2.

III. An introduction to tunnel types of a UE session.

There are a number of tunnel types proposed in the existing TR 23.799 as follows.

A Per QoS Class tunnel, where a tunnel between a pair of network functions is a per-UE, per-session, and per-quality-of-service type.

A per PDU session tunnel, where a tunnel between a pair of network functions is a per-UE and per-session type.

A per node-level tunnel, where a tunnel between a pair of network functions is a per-node type.

Non tunnel, i.e., an SDN-based approach, where there is no transmission tunnel between a pair of network functions.

In a legacy network including a legacy mobile communication network, e.g., an LTE network, only a single UE state machine and a single tunnel model, i.e., a per-bearer tunnel are supported. However in a next-generation network, there are various types of UEs, and different communication scenarios, and if there is the same state machine of these UEs, then there will be a waste of signaling, and it will be complex to maintain their states; and in order to set up session connections for the different UEs in these different scenarios, if an appropriate tunnel model can not be selected dynamically and flexibly, then there will an unnecessary waste of resources, e.g., an overhead of packet header encapsulation and de-encapsulation, an overhead of packet header transmission, etc.

Accordingly it is highly desirable in the next-generation network to configure dynamically a communicating UE with a matching parameter so as to improve the efficiency of resource utilization.

SUMMARY

Embodiments of the application provide a method for configuring a network, and a network device so as to select dynamically a mobility state machine and a tunnel type matching with a UE to thereby improve the efficiency of resource utilization.

Particular technical solutions according to the embodiments of the application are as follows.

In a first aspect, an embodiment of the application provides a method for configuring a network, the method including: determining an attribute of a UE when the UE accesses the network; determining a configuration parameter corresponding to the UE based upon the attribute of the UE; and indicating to or configuring the UE, and/or indicating to or configuring a related network function entity or node at the network side, according to the configuration parameter.

In a possible implementation, the attribute of the UE includes any one or more of: a capability of the UE; an mobility attribute of the UE; a session attribute of the UE; or a set of mobility states of the UE.

In a possible implementation, the mobility attribute of the UE includes a part or all of a mobility limitation, a mobility model, or a reachability requirement; and the session attribute of the UE includes a session type and/or a session continuity mode.

In a possible implementation, the capability of the UE is a parameter characterizing any one or more of: an operating mode supported by the UE; an access technology supported by the UE; or a mobility state supported by the UE.

In a possible implementation, the configuration parameter includes any one or more of a mobility state allowed for the UE, a mobility state of the network side, or a transmission tunnel type of the network side.

In a possible implementation, the determining the configuration parameter corresponding to the UE based upon the attribute of the UE includes: determining the mobility state allowed for the UE according to a part or all of the mobility limitation, the mobility model, the reachability requirement, or the capability of the UE.

In a possible implementation, the determining the mobility state allowed for the UE includes: when the mobility limitation is free mobility, and the reachability requirement is a support of positional tracking, determining that the UE is allowed to enter an idle state, and state transition conditions corresponding respectively to entering the idle state and quitting the idle state.

In a possible implementation, the determining the mobility state allowed for the UE includes: when the mobility limitation is immobility or limited mobility, and the reachability requirement is a support of positional tracking, or a support of a power-saving mode, determining that the UE is allowed to enter a Radio Resource Control (RRC)_Connected_Inactive state.

In a possible implementation, the determining the configuration parameter corresponding to the UE based upon the attribute of the UE includes: determining a set of mobility states of the core network side corresponding to the UE according to a part or all of the mobility limitation, the mobility model, the reachability requirement, or the capability of the UE; and determining an available mobility state of the access network side corresponding to the UE according to a part or all of the mobility limitation, the mobility model, the reachability requirement, or the capability of the UE.

In a possible implementation, the determining the set of mobility states of the core network side corresponding to the UE includes: when the mobility limitation is free immobility, and the reachability requirement is a support of positional tracking, determining the set of mobility states of the core network side corresponding to the UE as including an idle state, and state transition conditions corresponding respectively to entering the idle state and quitting the idle state.

In a possible implementation, the determining the available mobility state of the access network side corresponding to the UE includes: when the mobility limitation is immobility or limited mobility, and the reachability requirement is a support of positional tracking, or a support of a power-saving mode, determining the available mobility state of the access network side as including an RRC_Connected_Inactive state.

In a possible implementation, the determining the configuration parameter corresponding to the UE based upon the attribute of the UE includes: obtaining a set of mobility states of the UE; determining whether the obtained set of mobility states of the UE is appropriate, according to a part or all of the mobility limitation, the mobility model, the reachability requirement, or the capability of the UE; and determining a set of Non-Access Stratum (NAS) mobility states of the network side upon determining that the obtained set of mobility states of the UE is appropriate.

In a possible implementation, after the determining the set of Non-Access Stratum (NAS) mobility states of the network side, the method further includes: generating an RRC layer mobility state, or assisting an access network node in determining a mobility state parameter, according to a part or all of the set of mobility states, the mobility limitation, or the mobility model, of the UE.

In a possible implementation, the determining the configuration parameter corresponding to the UE based upon the attribute of the UE includes: determining the transmission tunnel type of the network side according to a part or all of the mobility limitation, the mobility model, the session type, or the session continuity model.

In a possible implementation, the determining the transmission tunnel type of the network side according to a part or all of the mobility limitation, the mobility model, the session type, or the session continuity model includes: when the mobility limitation is any limitation, and the session type is non-IP data transmission, determining the transmission tunnel type as a simple tunnel type; or when the mobility limitation is free mobility, and the session type is normal IP data transmission, determining the transmission tunnel type as a simple tunnel type or a no-tunnel type; or when the mobility limitation is limited mobility, and the session type is normal IP data transmission, and/or the session continuity mode is no continuity required, determining the transmission tunnel type as a simple tunnel type or a no-tunnel type; or when the mobility limitation is free mobility, and the session type is normal IP data transmission, determining the transmission tunnel type as a per-UE and per-session tunnel type; or when the mobility limitation is free mobility, and the session type is IP data transmission at a high priority, determining the transmission tunnel type as a per-UE, per-session, and per-quality-of-service tunnel type.

In a possible implementation, the indicating to or configuring the UE, and/or indicating to or configuring the related network function entity or node at the network side, according to the configuration parameter includes: configuring the core network with the set of mobility states of the core network side corresponding to the UE, and/or the state transition conditions; and/or indicating the mobility state, and/or a parameter for determining the mobility state to the access network node.

In a possible implementation, the indicating to or configuring the UE, and/or indicating to or configuring the related network function entity or node at the network side, according to the configuration parameter includes: configuring user-plane function modules of the network side according to the transmission tunnel type of the network side.

In a possible implementation, the indicating to or configuring the UE, and/or indicating to or configuring the related network function entity or node at the network side, according to the configuration parameter includes: indicating the mobility state allowed for the UE, and/or the state transition conditions to the UE.

In a second aspect, an embodiment of the application provides a network device including: a first determining module configured to determine an attribute of a UE when the UE accesses a network; a second determining module configured to determine a configuration parameter corresponding to the UE based upon the attribute of the UE; and a processing module configured to indicate to or to configure the UE, and/or to indicate to or to configure a related network function entity or node at the network side, according to the configuration parameter.

In a possible implementation, the attribute of the UE includes any one or more of: a capability of the UE; an mobility attribute of the UE; a session attribute of the UE; or a set of mobility states of the UE.

In a possible implementation, the mobility attribute of the UE includes a part or all of a mobility limitation, a mobility model, or a reachability requirement; and the session attribute of the UE includes a session type and/or a session continuity mode.

In a possible implementation, the capability of the UE is a parameter characterizing any one or more of: an operating mode supported by the UE; an access technology supported by the UE; or a mobility state supported by the UE.

In a possible implementation, the configuration parameter includes any one or more of a mobility state allowed for the UE, a mobility state of the network side, or a transmission tunnel type of the network side.

In a possible implementation, the second determining module is configured: to determine the mobility state allowed for the UE according to a part or all of the mobility limitation, the mobility model, the reachability requirement, or the capability of the UE.

In a possible implementation, the second determining module is configured: when the mobility limitation is free mobility, and the reachability requirement is a support of positional tracking, to determine that the UE is allowed to enter an idle state, and state transition conditions corresponding respectively to entering the idle state and quitting the idle state.

In a possible implementation, the second determining module is configured: when the mobility limitation is immobility or limited mobility, and the reachability requirement is a support of positional tracking, or a support of a power-saving mode, to determine that the UE is allowed to enter an RRC_Connected_Inactive state.

In a possible implementation, the second determining module is configured: to determine a set of mobility states of the core network side corresponding to the UE according to a part or all of the mobility limitation, the mobility model, the reachability requirement, or the capability of the UE; and to determine an available mobility state of the access network side corresponding to the UE according to a part or all of the mobility limitation, the mobility model, the reachability requirement, or the capability of the UE.

In a possible implementation, the second determining module is configured: when the mobility limitation is free immobility, and the reachability requirement is a support of positional tracking, to determine the set of mobility states of the core network side corresponding to the UE as including an idle state, and state transition conditions corresponding respectively to entering the idle state and quitting the idle state.

In a possible implementation, the second determining module is configured: when the mobility limitation is immobility or limited mobility, and the reachability requirement is a support of positional tracking, or a support of a power-saving mode, to determine the available mobility state of the access network side as including an RRC_Connected_Inactive state.

In a possible implementation, the second determining module is configured: to obtain a set of mobility states of the UE; to determine whether the obtained set of mobility states of the UE is appropriate, according to a part or all of the mobility limitation, the mobility model, the reachability requirement, or the capability of the UE; and to determine a set of NAS mobility states of the network side upon determining that the obtained set of mobility states of the UE is appropriate.

In a possible implementation, the second determining module is further configured: to generate an RRC layer mobility state, or to assist an access network node in determining a mobility state parameter, according to a part or all of the set of mobility states, the mobility limitation, or the mobility model, of the UE.

In a possible implementation, the second determining module is configured: to determine the transmission tunnel type of the network side is determined according to a part or all of the mobility limitation, the mobility model, the session type, or the session continuity model.

In a possible implementation, the second determining module is configured: when the mobility limitation is any limitation, and the session type is non-IP data transmission, to determine the transmission tunnel type as a simple tunnel type; or when the mobility limitation is free mobility, and the session type is normal IP data transmission, to determine the transmission tunnel type as a simple tunnel type or a no-tunnel type; or when the mobility limitation is limited mobility, and the session type is normal IP data transmission, and/or the session continuity mode is no continuity required, to determine the transmission tunnel type as a simple tunnel type or a no-tunnel type; or when the mobility limitation is free mobility, and the session type is normal IP data transmission, to determine the transmission tunnel type as a per-UE and per-session tunnel type; or when the mobility limitation is free mobility, and the session type is IP data transmission at a high priority, to determine the transmission tunnel type as a per-UE, per-session, and per-quality-of-service tunnel type.

In a possible implementation, the processing module is configured: to configure the core network with the set of mobility states of the core network side corresponding to the UE, and/or the state transition conditions; and/or to indicate the mobility state, and/or a parameter for determining the mobility state to the access network node.

In a possible implementation, the processing module is configured: to configure user-plane function modules of the network side according to the transmission tunnel type of the network side.

In a possible implementation, the processing module is configured: to indicate the mobility state allowed for the UE, and/or the state transition conditions to the UE.

In a third aspect, an embodiment of the application provides a network server including a processor, a memory, and a transceiver, wherein the transceiver receives and transmits data under the control of the processor, the memory stores preset program, and the processor reads and executes the program in the memory: to determine an attribute of a UE when the UE accesses a network; to determine a configuration parameter corresponding to the UE based upon the attribute of the UE; and to indicate to or to configure the UE, and/or to indicate to or to configure a related network function entity or node at the network side, according to the configuration parameter.

In a possible implementation, the attribute of the UE includes any one or more of: a capability of the UE; an mobility attribute of the UE; a session attribute of the UE; or a set of mobility states of the UE.

In a possible implementation, the mobility attribute of the UE includes a part or all of a mobility limitation, a mobility model, or a reachability requirement; and the session attribute of the UE includes a session type and/or a session continuity mode.

In a possible implementation, the capability of the UE is a parameter characterizing any one or more of: an operating mode supported by the UE; an access technology supported by the UE; or a mobility state supported by the UE.

In a possible implementation, the configuration parameter includes any one or more of a mobility state allowed for the UE, a mobility state of the network side, or a transmission tunnel type of the network side.

In a possible implementation, the processor is configured: to determine the mobility state allowed for the UE according to a part or all of the mobility limitation, the mobility model, the reachability requirement, or the capability of the UE.

In a possible implementation, the processor is configured: when the mobility limitation is free mobility, and the reachability requirement is a support of positional tracking, to determine that the UE is allowed to enter an idle state, and state transition conditions corresponding respectively to entering the idle state and quitting the idle state.

In a possible implementation, the processor is configured: when the mobility limitation is immobility or limited mobility, and the reachability requirement is a support of positional tracking, or a support of a power-saving mode, to determine that the UE is allowed to enter an RRC_Connected_Inactive state.

In a possible implementation, the processor is configured: to determine a set of mobility states of the core network side corresponding to the UE according to a part or all of the mobility limitation, the mobility model, the reachability requirement, or the capability of the UE; and to determine an available mobility state of the access network side corresponding to the UE according to a part or all of the mobility limitation, the mobility model, the reachability requirement, or the capability of the UE.

In a possible implementation, the processor is configured: when the mobility limitation is free immobility, and the reachability requirement is a support of positional tracking, to determine the set of mobility states of the core network side corresponding to the UE as including an idle state, and state transition conditions corresponding respectively to entering the idle state and quitting the idle state.

In a possible implementation, the processor is configured: when the mobility limitation is immobility or limited mobility, and the reachability requirement is a support of positional tracking, or a support of a power-saving mode, to determine the available mobility state of the access network side as including an RRC_Connected_Inactive state.

In a possible implementation, the processor is configured: to obtain a set of mobility states of the UE; to determine whether the obtained set of mobility states of the UE is appropriate, according to a part or all of the mobility limitation, the mobility model, the reachability requirement, or the capability of the UE; and to determine a set of NAS mobility states of the network side upon determining that the obtained set of mobility states of the UE is appropriate.

In a possible implementation, the processor is configured: to generate an RRC layer mobility state, or to assist an access network node in determining a mobility state parameter, according to a part or all of the set of mobility states, the mobility limitation, or the mobility model, of the UE.

In a possible implementation, the processor is configured to determine the transmission tunnel type of the network side is determined according to a part or all of the mobility limitation, the mobility model, the session type, or the session continuity model.

In a possible implementation, the processor is configured, when the mobility limitation is any limitation, and the session type is non-IP data transmission, to determine the transmission tunnel type as a simple tunnel type; or when the mobility limitation is free mobility, and the session type is normal IP data transmission, to determine the transmission tunnel type as a simple tunnel type or a no-tunnel type; or when the mobility limitation is limited mobility, and the session type is normal IP data transmission, and/or session continuity mode is no continuity required, to determine the transmission tunnel type as a simple tunnel type or a no-tunnel type; or when the mobility limitation is free mobility, and the session type is normal IP data transmission, to determine the transmission tunnel type as a per-UE and per-session tunnel type; or when the mobility limitation is free mobility, and the session type is IP data transmission at a high priority, to determine the transmission tunnel type as a per-UE, per-session, and per-quality-of-service tunnel type.

In a possible implementation, the processor is configured: to configure the core network with the set of mobility states of the core network side corresponding to the UE, and/or the state transition conditions; and/or to indicate the mobility state, and/or a parameter for determining the mobility state to the access network node.

In a possible implementation, the processor is configured to configure user-plane function modules of the network side according to the transmission tunnel type of the network side.

In a possible implementation, the processor is configured to indicate the mobility state allowed for the UE, and/or the state transition conditions to the UE.

With the technical solutions above according to the embodiments of the application, an attribute of a UE is determined when the UE accesses a network, a configuration parameter corresponding to the UE is determined based upon the attribute of the UE, and the UE is indicated to or configured, and/or a related network function entity or node at the network side is indicated to or configured, according to the configuration parameter, so that the parameter of the UE or the network side can be adjusted dynamically to attribute information of the UE to thereby reduce a waste of signaling, lower the complexity of maintaining a state, and reduce a waste of other resources so as to configure dynamically the communicating UE with the matching parameter, thus improving the efficiency of resource utilization.

DETAILED DESCRIPTION OF THE EMBODIMENTS

In order to make the objects, technical solutions, and advantages of the application more apparent, the technical solutions according to the embodiments of the application will be described below in further details with reference to the drawings, and apparently the embodiments to be described below are only a part but not all of the embodiments of the application. Based upon the embodiments here of the application, all the other embodiments which can occur to those ordinarily skilled in the art without any inventive effort shall fall into the scope of the application.

Figure 1:
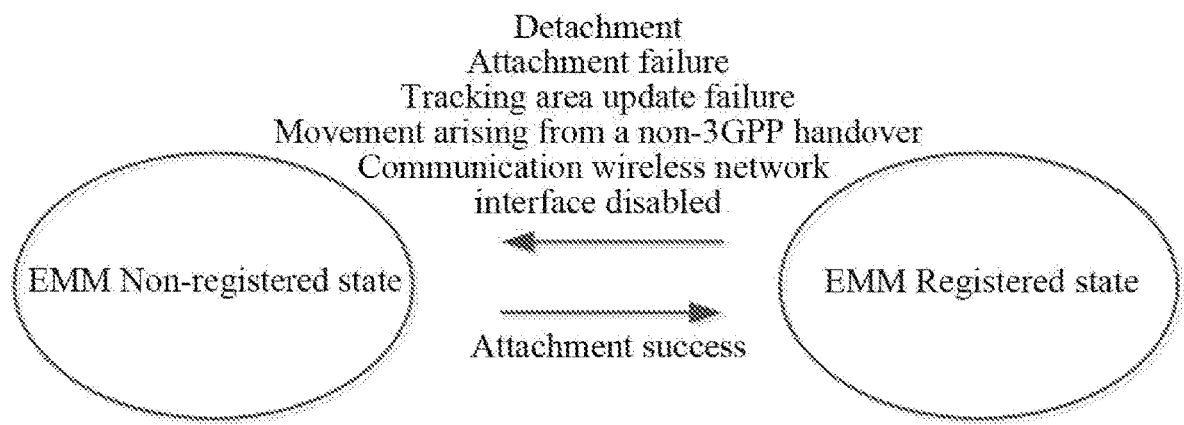
FIG. 1 is a schematic diagram of a universal state machine model of UEs in an EPS according to an embodiment of the application.
Figure 2:
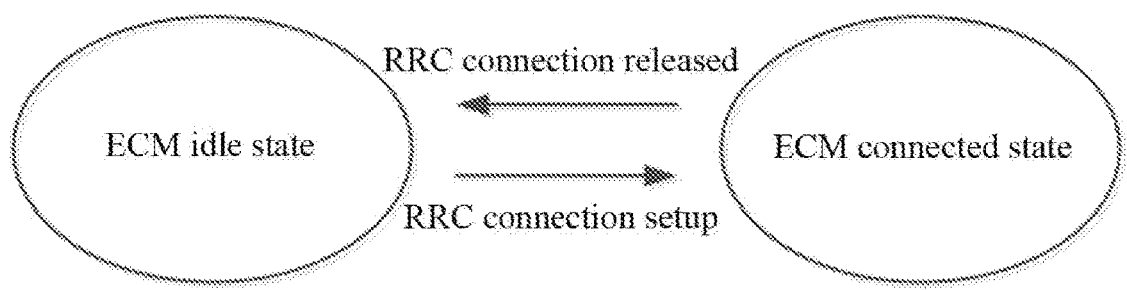
FIG. 2 is a schematic diagram of state transition of a UE in an EPS Mobility Management (EMM) registered state in the EPS system according to the embodiment of the application.
Figure 3:
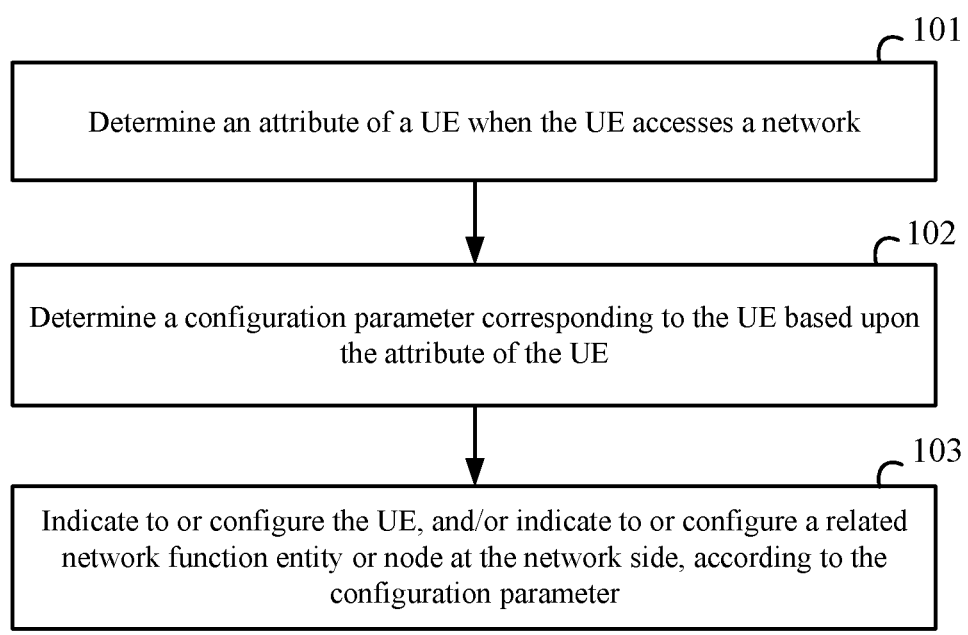
FIG. 3 is a schematic flow chart of a method for configuring a network according to an embodiment of the application.

As illustrated in FIG. 3, a process of configuring a network according to an embodiment of the application is as follows.

The step 101 is to determine an attribute of a UE when the UE accesses a network.

In a particular implementation, a core-network control-plane function can perform the process of configuring the network, and the network side particularly includes a core network and a Radio Access Network (RAN).

In the embodiment of the application, the attribute of the UE includes any one or more of: a capability of the UE; an mobility attribute of the UE; a session attribute of the UE; or a set of mobility states of the UE.

In the embodiment of the application, the mobility attribute of the UE includes a part or all of a mobility limitation, a mobility model, or a reachability requirement, and the session attribute of the UE includes a session type and/or a session continuity mode.

In the embodiment of the application, the mobility limitation can also be referred to as a mobility level.

The mobility model is determined according to a movement regularity and the mobility level of the UE.

The capability of the UE is a parameter characterizing any one or more of: an operating mode supported by the UE, e.g., a mobile broadband (eMBB) mode, a low-delay and highly reliable communication (CriCom) mode, a massive machine communication (mIoT) mode, etc., where in an implementation, the operating mode can be indicated using a usage type or a Dedicated Core network Identifier (DCN ID); an access technology supported by the UE, e.g., a 5G access technology, a 4G access technology, etc.; or a mobility state supported by the UE, e.g., a power-saving state, an RRC_Connected_Inactive state, etc.

In a particular implementation, when the UE is attached to or accesses the network, the core-network control-plane function determines the capability of the UE, and/or the mobility attribute of the UE, and/or the session attribute of the UE, and/or the set of mobility states of the UE. The mobility level may be immobility, limited mobility, and free mobility, for example. Of course, those skilled in the art can alternatively set other mobility levels as needed in practice, although the embodiment of the application will not be limited thereto. The reachability requirement refers to that downlink data can be ensured to reach the UE, that is, the network shall be able to detect whether the idle UE can be paged. The reachability requirement further includes whether a power-saving mode is supported, that is, whether the UE supports operating in the power-saving mode or state; or whether positional tracking is supported, that is, whether the UE is required to report its positional information to the network. Of course, the reachability requirement can alternatively include other modes, although the embodiment of the application will not be limited thereto.

The session attribute of the UE generally includes the session type and the session continuity mode. From different perspectives, the session type includes IP data transmission and non-IP data transmission; and/or a session which is set up at the control plane, and a session which is set up at the user plane; and/or a session at a normal priority and a session at a high priority; and/or the like. Those skilled in the art can define the session type as needed in practice. The session continuity mode generally includes the following three modes.

In a mode 1, an anchor of a session is not changed, service continuity is guaranteed, and session continuity is maintained.

In a mode 2, an anchor of a session may be changed, service continuity is not guaranteed, but session continuity is maintained.

In a mode 3, an anchor of a session may be changed, but there are two sessions providing a traffic service, and at this time, service continuity is not guaranteed, but session continuity is not maintained.

The capability of the UE characterizes the mobility states supported by the UE particularly as a mobility state of the UE determined by the UE according to its mobility model, UE capability, configuration, etc.

After the step S101 is performed, the method according to the embodiment of the application further includes the step S102 of determining a configuration parameter corresponding to the UE based upon the attribute of the UE.

In the embodiment of the application, the configuration parameter includes any one or more of a mobility state allowed for the UE, a mobility state of the network side, or a transmission tunnel type of the network side.

In a particular implementation, those skilled in the art can further configure other parameters of the network side or the UE as needed in practice, although the embodiment of the application will not be limited thereto.

In the embodiment of the application, the parameter is generally configured by determining a mobility state allowed for the UE, and determining configuration parameters of the network side, respectively as described below in details.

On one hand, the mobility state allowed for the UE is determined as follows.

The mobility state allowed for the UE is determined according to a part or all of the mobility limitation, the mobility model, the reachability requirement, or the capability of the UE.

In the embodiment of the application, the mobility state allowed for the UE is determined as follows.

When the mobility limitation is free mobility, and the reachability requirement is a support of positional tracking, it is determined that the UE is allowed to enter an idle state, and state transition conditions corresponding respectively to entering the idle state and quitting the idle state are determined.

In the embodiment of the application, the mobility state allowed for the UE is determined as follows.

When the mobility limitation is immobility or limited mobility, and the reachability requirement is a support of positional tracking, or a support of a power-saving mode, it is determined that the UE is allowed to enter an RRC_Connected_Inactive state.

In a particular implementation, those skilled in the art can alternatively configure the UE with other mobility states as needed in practice, although the embodiment of the application will not be limited thereto.

On the other hand, the configuration parameters of the network side are determined, where the configuration parameters of the network side are generally determined by determining a mobility state of the network side, and a transmission tunnel type of the network side.

1. The mobility state of the network side is determined in the embodiment of the application in the following two implementations without any limitation thereto.

Figure 4:
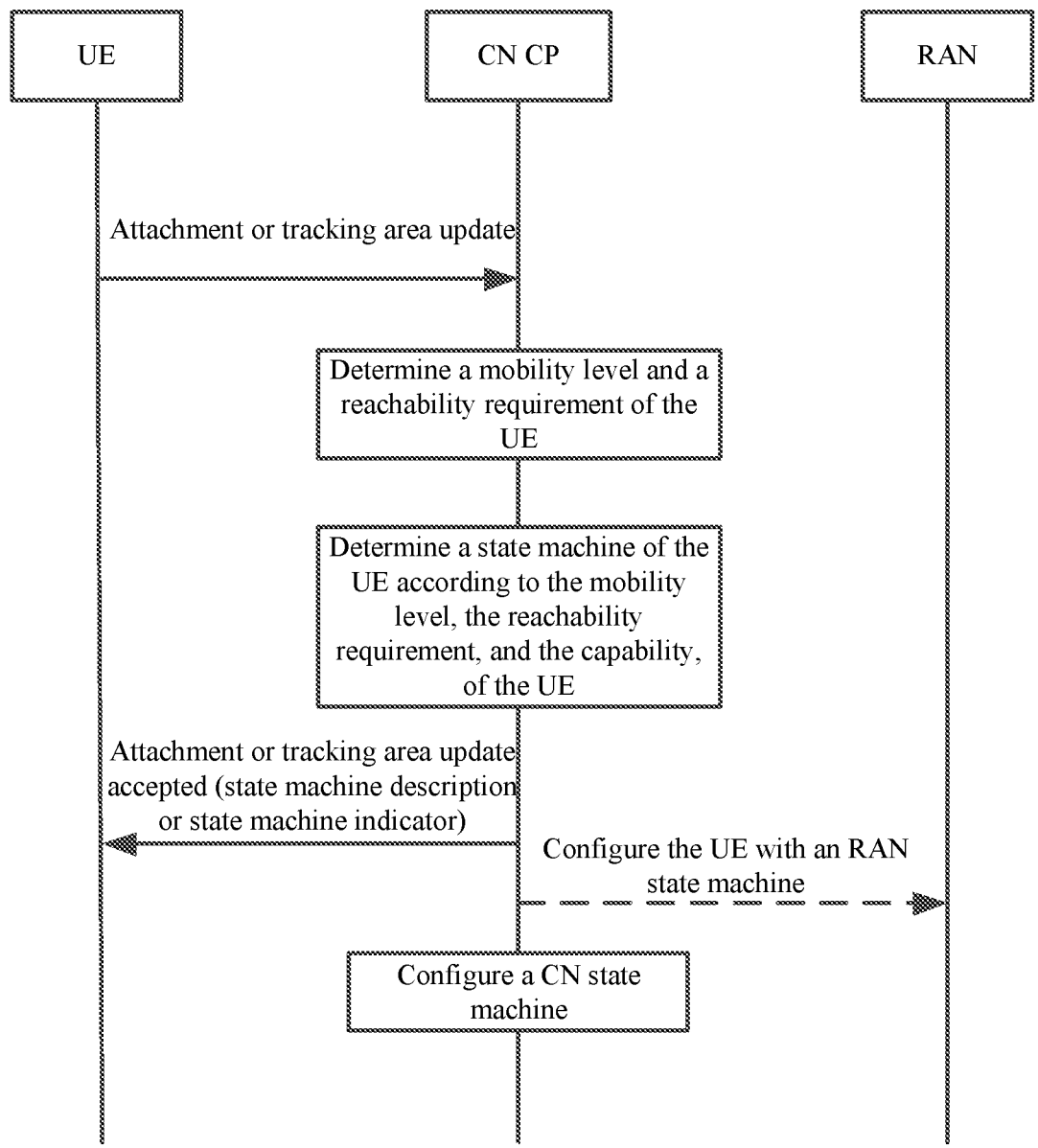
FIG. 4 is a schematic diagram of a first implementation in which a mobility state of the network side is determined according to an embodiment of the application.

In a first implementation as illustrated in FIG. 4: a set of mobility states of the core network side corresponding to the UE is determined according to a part or all of the mobility limitation, the mobility model, the reachability requirement, or the capability of the UE; and an available mobility state of the access network side corresponding to the UE is determined according to a part or all of the mobility limitation, the mobility model, the reachability requirement, or the capability of the UE.

In a particular implementation, the mobility state of the network side is determined by determining the set of mobility states of the core network side, and the available mobility state of the access network side. When the UE is attached to or accesses the network, the core-network control-plane function determines a mobility state of the network side matching with the UE according to the capability, the mobility limitation, the mobility model, and the reachability requirement, of the UE.

In the embodiment of the application, the set of mobility states of the core network side corresponding to the UE is determined as follows.

When the mobility limitation is free immobility, and the reachability requirement is a support of positional tracking, the set of mobility states of the core network side corresponding to the UE is determined as including an idle state, and state transition conditions corresponding respectively to entering the idle state and quitting the idle state.

The available mobility state of the access network side corresponding to the UE is determined as follows.

When the mobility limitation is immobility or limited mobility, and the reachability requirement is a support of positional tracking, or a support of a power-saving mode, the available mobility state of the access network side is determined as including an RRC_Connected_Inactive state.

In a second implementation, the configuration parameters of the network side corresponding to the UE are determined based upon the attribute of the UE as follows.

A set of mobility states of the UE is obtained.

It is determined whether the obtained set of mobility states of the UE is appropriate, according to a part or all of the mobility limitation, the mobility model, the reachability requirement, or the capability of the UE.

A set of NAS mobility states of the network side is determined upon determining that the obtained set of mobility states of the UE is appropriate.

In a particular implementation, when the UE is attached to or accesses the network, the UE determines a state machine model of the UE according to its mobility model, UE capability, configuration, etc., and then the UE indicates the determined state machine model thereof to a network server explicitly or implicitly, for example, using a UE usage type indicator, i.e., the set of mobility sets of the UE. At this time, the core-network control-plane function determines whether the set of mobility states indicated by the UE is appropriate, according to the mobility limitation, the mobility model, and the reachability requirement of the UE, and subscription information of the UE. The subscription information of the UE can include a usage type allowed for the UE, a reachability characteristic of the UE, etc., although the embodiment of the application will not be limited thereto. The core-network control-plane function determines the set of NAS mobility states of the network side according to the set of mobility states indicated by the UE upon determining that the set of mobility states determined by the UE is appropriate.

In the embodiment of the application, after the set of NAS mobility states of the network side is determined, the method further includes: an RRC layer mobility state is generated, or an access network node is assisted in determining a mobility state parameter, according to a part or all of the set of mobility states, the mobility limitation, or the mobility model, of the UE.

In a particular implementation, the core-network control-plane function can further generate the RRC layer mobility state, or determine a mobility state assistance parameter of the access network node, e.g., an indicator of whether to activate an RRC_Connected_Inactive state, a mobility limitation indicator of the UE, a mobility model indicator of the UE, etc., according to the set of mobility states indicated by the UE.

2. The transmission tunnel type of the network side is determined as follows.

The transmission tunnel type of the network side is determined according to a part or all of the mobility limitation, the mobility model, the session type, or the session continuity model.

In the embodiment of the application, the transmission tunnel type of the network side is determined according to a part or all of the mobility limitation, the mobility model, the session type, or the session continuity model as follows: when the mobility limitation is any limitation, and the session type is non-IP data transmission, the transmission tunnel type is determined as a simple tunnel type; or when the mobility limitation is free mobility, and the session type is normal IP data transmission, the transmission tunnel type is determined as a simple tunnel type or a no-tunnel type; or when the mobility limitation is limited mobility, and the session type is normal IP data transmission, and/or the session continuity mode is no continuity required, the transmission tunnel type is determined as a simple tunnel type or a no-tunnel type; or when the mobility limitation is free mobility, and the session type is normal IP data transmission, the transmission tunnel type is determined as a per-UE and per-session tunnel type; or when the mobility limitation is free mobility, and the session type is IP data transmission at a high priority, the transmission tunnel type is determined as a per-UE, per-session, and per-quality-of-service tunnel type.

Figure 5:
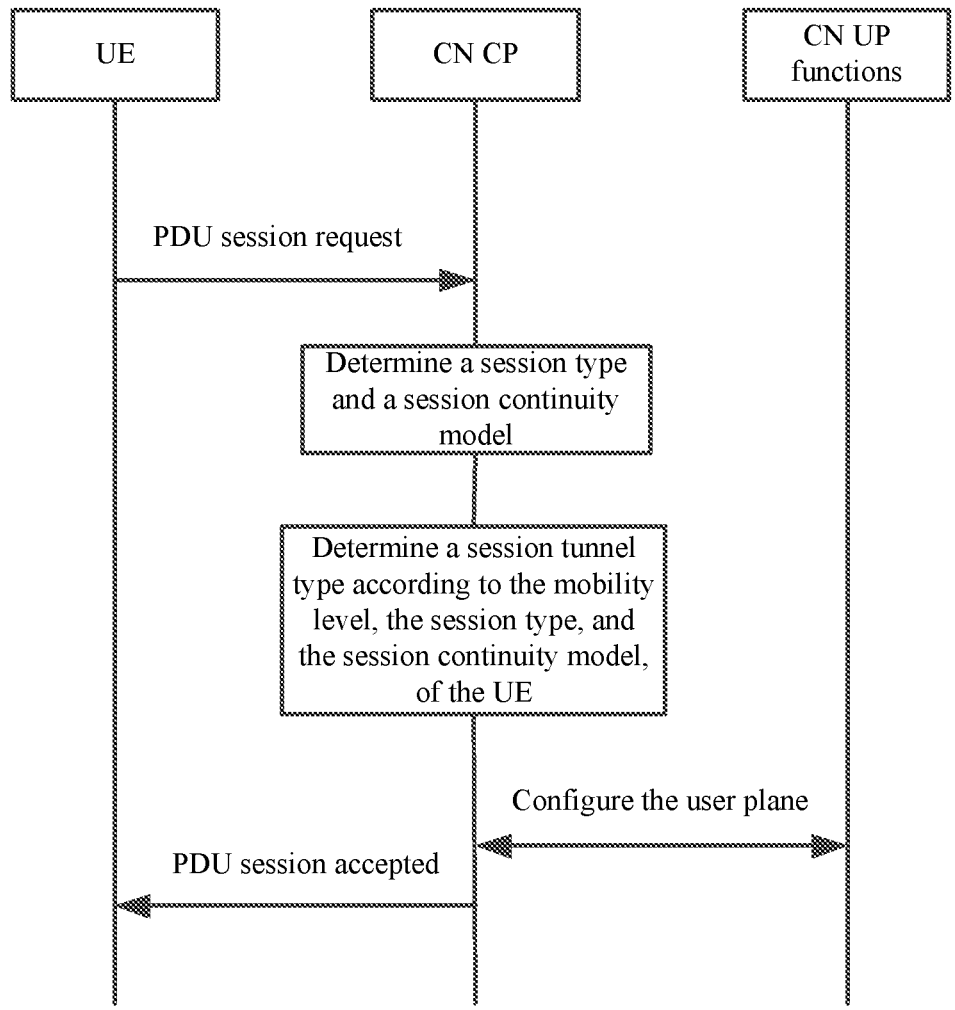
FIG. 5 is a schematic flow chart of determining a transmission tunnel type of the network side according to an embodiment of the application.

In a particular implementation, FIG. 5 illustrates a process of determining a transmission tunnel type according to an embodiment of the application. When the UE initiates a Protocol Data Unit (PDU) session connection setup request, the core-network control-plane function determines a session tunnel type according to the mobility limitation, the mobility model, the session type, and the session continuity mode, of the UE.

After the step 102 is performed, the method according to the embodiment of the application further includes the step S103 of indicating to or configuring the UE, and/or indicating to or configuring a related network function entity or node at the network side, according to the configuration parameter.

In the embodiment of the application, the UE is indicated to or configured, or the related network function entity or node at the network side is indicated to or configured, according to the configuration parameter in the following three aspects.

In a first aspect: the core network is configured with the set of mobility states of the core network side corresponding to the UE, and/or the state transition conditions; and/or the mobility state, and/or a parameter for determining the mobility state is indicated to the access network node.

In a particular implementation, the core-network control-plane function configures the core network and related nodes of the access network respectively with the parameters to satisfy the mobility requirement of the UE, upon determining the set of mobility sets of the network side, and transition conditions of the respective states.

In a second aspect: user-plane function modules of the network side are configured according to the transmission tunnel type of the network side.

In a particular implementation, the core-network control-plane function configures the user-plane function modules according to the transmission tunnel type to set up a tunnel required of the UE, upon determining the transmission tunnel type of the network side for communication with the UE.

In a third aspect: the mobility state allowed for the UE, and/or the state transition conditions is or are indicated to the UE.

In a particular implementation, the core-network control-plane function transmits an indicator for configuring the mobility state to the UE, upon determining the mobility state allowed for the UE, and/or the state transition conditions according to the attribute of the UE, where the indicator is particularly a description of the mobility state, or can be an instruction for enabling the mobility state, so that the UE configures the mobility state upon reception of the description of the mobility state, or the UE enables the corresponding type of mobility state according to the instruction for enabling the mobility state, upon reception of the instruction.

Figure 6:
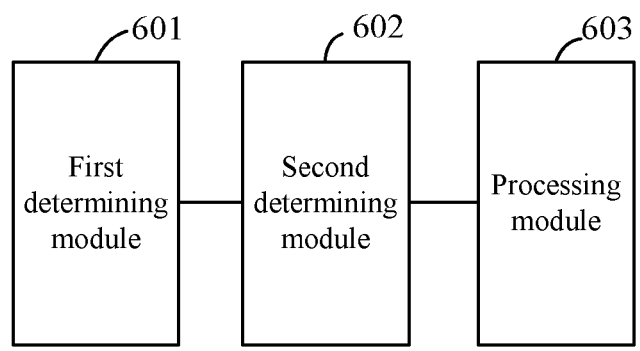
FIG. 6 is a schematic structural diagram of a network device according to an embodiment of the application.

Based upon the same inventive idea, an embodiment of the application provides a network device, and for a particular implementation of the network device, reference can be made to the description of the method according to the embodiment of the application, so a repeated description thereof will be omitted here; and as illustrated in FIG. 6, the network device generally includes follows.

A first determining module 601 is configured to determine an attribute of a UE when the UE accesses a network.

A second determining module 602 is configured to determine a configuration parameter corresponding to the UE based upon the attribute of the UE.

A processing module 603 is configured to indicate to or to configure the UE, and/or to indicate to or to configure a related network function entity or node at the network side, according to the configuration parameter.

In a possible implementation, the attribute of the UE includes any one or more of: a capability of the UE; an mobility attribute of the UE; a session attribute of the UE; or a set of mobility states of the UE.

In a possible implementation, the mobility attribute of the UE includes a part or all of a mobility limitation, a mobility model, or a reachability requirement, and the session attribute of the UE includes a session type and/or a session continuity mode.

In a possible implementation, the capability of the UE is a parameter characterizing any one or more of: an operating mode supported by the UE; an access technology supported by the UE; or a mobility state supported by the UE.

In a possible implementation, the configuration parameter includes any one or more of a mobility state allowed for the UE, a mobility state of the network side, or a transmission tunnel type of the network side.

In a possible implementation, the second determining module 602 is configured: to determine the mobility state allowed for the UE according to a part or all of the mobility limitation, the mobility model, the reachability requirement, or the capability of the UE.

In a possible implementation, the second determining module 602 is configured: when the mobility limitation is free mobility, and the reachability requirement is a support of positional tracking, to determine that the UE is allowed to enter an idle state, and state transition conditions corresponding respectively to entering the idle state and quitting the idle state.

In a possible implementation, the second determining module 602 is configured: when the mobility limitation is immobility or limited mobility, and the reachability requirement is a support of positional tracking, or a support of a power-saving mode, to determine that the UE is allowed to enter an RRC_Connected_Inactive state.

In a possible implementation, the second determining module 602 is configured: to determine a set of mobility states of the core network side corresponding to the UE according to a part or all of the mobility limitation, the mobility model, the reachability requirement, or the capability of the UE; and to determine an available mobility state of the access network side corresponding to the UE according to a part or all of the mobility limitation, the mobility model, the reachability requirement, or the capability of the UE.

In a possible implementation, the second determining module 602 is configured: when the mobility limitation is free immobility, and the reachability requirement is a support of positional tracking, to determine the set of mobility states of the core network side corresponding to the UE as including an idle state, and state transition conditions corresponding respectively to entering the idle state and quitting the idle state.

In a possible implementation, the second determining module 602 is configured: when the mobility limitation is immobility or limited mobility, and the reachability requirement is a support of positional tracking, or a support of a power-saving mode, to determine the available mobility state of the access network side as including an RRC_Connected_Inactive state.

In a possible implementation, the second determining module 602 is configured: to obtain a set of mobility states of the UE; to determine whether the obtained set of mobility states of the UE is appropriate, according to a part or all of the mobility limitation, the mobility model, the reachability requirement, or the capability of the UE; and to determine a set of NAS mobility states of the network side upon determining that the obtained set of mobility states of the UE is appropriate.

In a possible implementation, the second determining module 602 is further configured: to generate an RRC layer mobility state, or to assist an access network node in determining a mobility state parameter, according to a part or all of the set of mobility states, the mobility limitation, or the mobility model, of the UE.

In a possible implementation, the second determining module 602 is configured: to determine the transmission tunnel type of the network side is determined according to a part or all of the mobility limitation, the mobility model, the session type, or the session continuity model.

In a possible implementation, the second determining module 602 is configured: when the mobility limitation is any limitation, and the session type is non-IP data transmission, to determine the transmission tunnel type as a simple tunnel type; or when the mobility limitation is free mobility, and the session type is normal IP data transmission, to determine the transmission tunnel type as a simple tunnel type or a no-tunnel type; or when the mobility limitation is limited mobility, and the session type is normal IP data transmission, and/or the session continuity mode is no continuity required, to determine the transmission tunnel type as a simple tunnel type or a no-tunnel type; or when the mobility limitation is free mobility, and the session type is normal IP data transmission, to determine the transmission tunnel type as a per-UE and per-session tunnel type; or when the mobility limitation is free mobility, and the session type is IP data transmission at a high priority, to determine the transmission tunnel type as a per-UE, per-session, and per-quality-of-service tunnel type.

In a possible implementation, the processing module 603 is configured: to configure the core network with the set of mobility states of the core network side corresponding to the UE, and/or the state transition conditions; and/or to indicate the mobility state, and/or a parameter for determining the mobility state to the access network node.

In a possible implementation, the processing module 603 is configured: to configure user-plane function modules of the network side according to the transmission tunnel type of the network side.

In a possible implementation, the processing module 603 is configured: to indicate the mobility state allowed for the UE, and/or the state transition conditions to the UE.

Figure 7:
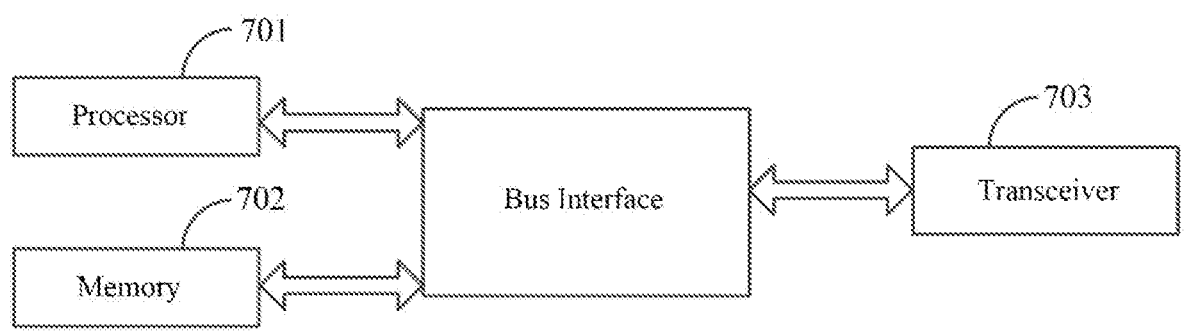
FIG. 7 is a schematic structural diagram of another network device according to an embodiment of the application.

Based upon the same inventive idea, an embodiment of the application provides a network device, and for a particular implementation of the network device, reference can be made to the description of the method according to the embodiment of the application, so a repeated description thereof will be omitted here; and as illustrated in FIG. 7, the network device generally includes a processor 701, a memory 702, and a transceiver 703, where the transceiver 703 receives and transmits data under the control of the processor 701, the memory 702 stores preset program, and the processor 701 reads and executes the program in the memory 702: to determine an attribute of a UE when the UE accesses a network; to determine a configuration parameter corresponding to the UE based upon the attribute of the UE; and to indicate to or to configure the UE, and/or to indicate to or to configure a related network function entity or node at the network side, according to the configuration parameter.

Here in FIG. 7, the bus architecture can include any number of interconnecting buses and bridges to particularly link together various circuits including one or more processors represented by the processor 701, and one or more memories represented by the memory 702. The bus architecture can further link together various other circuits, e.g., a peripheral device, a manostat, a power management circuit, etc., all of which are well known in the art, so a further description thereof will be omitted in this context. The bus interface serves as an interface. The transceiver 703 can be a number of elements, e.g., a transmitter and a receiver, which are units for communication with various other devices over a transmission medium. The processor 701 is responsible for managing the bus architecture and performing normal processes, and the memory 702 can store data for use by the processor 701 in performing the operations.

In a possible implementation, the attribute of the UE includes any one or more of: a capability of the UE; an mobility attribute of the UE; a session attribute of the UE; or A set of mobility states of the UE.

In a possible implementation, the mobility attribute of the UE includes a part or all of a mobility limitation, a mobility model, or a reachability requirement, and the session attribute of the UE includes a session type and/or a session continuity mode.

In a possible implementation, the capability of the UE is a parameter characterizing any one or more of: an operating mode supported by the UE; an access technology supported by the UE; or a mobility state supported by the UE.

In a possible implementation, the configuration parameter includes any one or more of a mobility state allowed for the UE, a mobility state of the network side, or a transmission tunnel type of the network side.

In a possible implementation, the processor 701 is configured to determine the mobility state allowed for the UE according to a part or all of the mobility limitation, the mobility model, the reachability requirement, or the capability of the UE.

In a possible implementation, the processor 701 is configured, when the mobility limitation is free mobility, and the reachability requirement is a support of positional tracking, to determine that the UE is allowed to enter an idle state, and state transition conditions corresponding respectively to entering the idle state and quitting the idle state.

In a possible implementation, the processor 701 is configured, when the mobility limitation is immobility or limited mobility, and the reachability requirement is a support of positional tracking, or a support of a power-saving mode, to determine that the UE is allowed to enter an RRC_Connected_Inactive state.

In a possible implementation, the processor 701 is configured to determine a set of mobility states of the core network side corresponding to the UE according to a part or all of the mobility limitation, the mobility model, the reachability requirement, or the capability of the UE; and to determine an available mobility state of the access network side corresponding to the UE according to a part or all of the mobility limitation, the mobility model, the reachability requirement, or the capability of the UE.

In a possible implementation, the processor 701 is configured, when the mobility limitation is free immobility, and the reachability requirement is a support of positional tracking, to determine the set of mobility states of the core network side corresponding to the UE as including an idle state, and state transition conditions corresponding respectively to entering the idle state and quitting the idle state.

In a possible implementation, the processor 701 is configured, when the mobility limitation is immobility or limited mobility, and the reachability requirement is a support of positional tracking, or a support of a power-saving mode, to determine the available mobility state of the access network side as including an RRC_Connected_Inactive state.

In a possible implementation, the processor 701 is configured, to obtain a set of mobility states of the UE; to determine whether the obtained set of mobility states of the UE is appropriate, according to a part or all of the mobility limitation, the mobility model, the reachability requirement, or the capability of the UE; and to determine a set of NAS mobility states of the network side upon determining that the obtained set of mobility states of the UE is appropriate.

In a possible implementation, the processor 701 is configured to generate an RRC layer mobility state, or to assist an access network node in determining a mobility state parameter, according to a part or all of the set of mobility states, the mobility limitation, or the mobility model, of the UE.

In a possible implementation, the processor 701 is configured, to determine the transmission tunnel type of the network side is determined according to a part or all of the mobility limitation, the mobility model, the session type, or the session continuity model.

In a possible implementation, the processor 701 is configured, when the mobility limitation is any limitation, and the session type is non-IP data transmission, to determine the transmission tunnel type as a simple tunnel type; or when the mobility limitation is free mobility, and the session type is normal IP data transmission, to determine the transmission tunnel type as a simple tunnel type or a no-tunnel type; or when the mobility limitation is limited mobility, and the session type is normal IP data transmission, and/or the session continuity mode is no continuity required, to determine the transmission tunnel type as a simple tunnel type or a no-tunnel type; or when the mobility limitation is free mobility, and the session type is normal IP data transmission, to determine the transmission tunnel type as a per-UE and per-session tunnel type; or when the mobility limitation is free mobility, and the session type is IP data transmission at a high priority, to determine the transmission tunnel type as a per-UE, per-session, and per-quality-of-service tunnel type.

In a possible implementation, the processor 701 is configured to configure the core network with the set of mobility states of the core network side corresponding to the UE, and/or the state transition conditions; and/or to indicate the mobility state, and/or a parameter for determining the mobility state to the access network node.

In a possible implementation, the processor 701 is configured to configure user-plane function modules of the network side according to the transmission tunnel type of the network side.

In a possible implementation, the processor 701 is configured to indicate the mobility state allowed for the UE, and/or the state transition conditions to the UE.

With the technical solutions above according to the embodiments of the application, an attribute of a UE is determined when the UE accesses a network, a configuration parameter corresponding to the UE is determined based upon the attribute of the UE, and the UE is indicated to or configured, and/or a related network function entity or node at the network side is indicated to or configured, according to the configuration parameter, so that the parameter of the UE or the network side can be adjusted dynamically to attribute information of the UE to thereby reduce a waste of signaling, lower the complexity of maintaining a state, and reduce a waste of other resources so as to configure dynamically the communicating UE with the matching parameter, thus improving the efficiency of resource utilization.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for configuring UE or a related network function entity or node at a network, the method comprising:
    determining an attribute of a User Equipment (UE) when the UE accesses the network;
    determining a configuration parameter corresponding to the UE based upon the attribute of the UE; wherein the configuration parameter comprises any one or more of: a mobility state allowed for the UE, a mobility state of the network side, and a transmission tunnel type of the network side; and
    indicating the UE to configure, or configuring the UE, according to the configuration parameter, and/or
    indicating the related network function entity or node to configure, or configuring the related network function entity or node at the network side, according to the configuration parameter;
    wherein the determining the configuration parameter corresponding to the UE based upon the attribute of the UE comprises:
    obtaining a set of mobility states of the UE;
    determining whether the obtained set of mobility states of the UE is appropriate, according to a part or all of: a mobility limitation, a mobility model, a reachability requirement, and a capability of the UE; and
    determining a set of Non-Access Stratum (NAS) mobility states of the network side upon determining that the obtained set of mobility states of the UE is appropriate; and
    after the determining the set of NAS mobility states of the network side, the method further comprises:
    generating a Radio Resource Control (RRC) layer mobility state, or assisting an access network node in determining a mobility state parameter, according to a part or all of the set of mobility states, the mobility limitation, or the mobility model, of the UE.

2. The method according to claim 1, wherein the attribute of the UE further comprises any one or more of:
    a capability of the UE;
    a mobility attribute of the UE;
    a session attribute of the UE; and
    a set of mobility states of the UE.

3. The method according to claim 2, wherein:
    the mobility attribute of the UE comprises a part or all of: the mobility limitation, the mobility model, and a reachability requirement; and
    the session attribute of the UE comprises a session type and/or a session continuity mode.

4. The method according to claim 3, wherein the capability of the UE is a parameter characterizing any one or more of:
    an operating mode supported by the UE;
    an access technology supported by the UE; and
    a mobility state supported by the UE.

5. The method according to claim 1, wherein the determining the configuration parameter corresponding to the UE based upon the attribute of the UE comprises:
    determining the mobility state allowed for the UE according to a part or all of:
    the mobility limitation,
    the mobility model,
    the reachability requirement, and
    the capability of the UE.

6. The method according to claim 5, wherein when the mobility state allowed for the UE is determined at least according to the mobility limitation, and the reachability requirement, the determining the mobility state allowed for the UE comprises:

when the mobility limitation is a free mobility, and the reachability requirement is a support of positional tracking, determining that the UE is allowed to enter an idle state, and state transition conditions corresponding respectively to entering the idle state and quitting the idle state.

7. The method according to claim 5, wherein when the mobility state allowed for the UE is determined at least according to the mobility limitation, and the reachability requirement, the determining the mobility state allowed for the UE comprises:

when the mobility limitation is an immobility or a limited mobility, and the reachability requirement is a support of positional tracking, or a support of a power-saving mode, determining that the UE is allowed to enter a Radio Resource Control (RRC) Connected_Inactive state.

8. The method according to claim 1, wherein the indicating the related network function entity or node at the network side to configure, or configuring the related network function entity or node at the network side, according to the configuration parameter comprises:

indicating the mobility state, and/or a parameter for determining the mobility state to the access network node.

9. The method according to claim 1, wherein the determining the configuration parameter corresponding to the UE based upon the attribute of the UE comprises:

determining the transmission tunnel type of the network side according to a part or all of: the mobility limitation, the mobility model, a session type, and a session continuity mode.

10. The method according to claim 9, wherein the determining the transmission tunnel type of the network side according to a part or all of: the mobility limitation, the mobility model, the session type, and the session continuity mode comprises:

when the mobility limitation is any limitation, and the session type is non-Internet Protocol (IP) data transmission, determining the transmission tunnel type as a simple tunnel type; or when the mobility limitation is a free mobility, and the session type is normal IP data transmission, determining the transmission tunnel type as a simple tunnel type or a no-tunnel type; or when the mobility limitation is a limited mobility, and the session type is normal IP data transmission, and/or the session continuity mode is no continuity required, determining the transmission tunnel type as a simple tunnel type or a no-tunnel type; or when the mobility limitation is the free mobility, and the session type is normal IP data transmission, determining the transmission tunnel type as a per-UE and per-session tunnel type; or when the mobility limitation is the free mobility, and the session type is IP data transmission at a high priority, determining the transmission tunnel type as a per-UE, per-session, and per-quality-of-service tunnel type.

11. The method according to claim 10, wherein the indicating the related network function entity or node at the network side to configure, or configuring the related network function entity or node at the network side, according to the configuration parameter comprises:

configuring user-plane function modules of the network side according to the transmission tunnel type of the network side.

12. A network device, comprising a processor and a memory, wherein the memory stores preset program and the processor reads and executes the program in the memory:

to determine an attribute of a User Equipment (UE) when the UE accesses a network;

to determine a configuration parameter corresponding to the UE based upon the attribute of the UE; wherein the configuration parameter comprises any one or more of: a mobility state allowed for the UE, a mobility state of the network side, and a transmission tunnel type of the network side; and to indicate the UE to configure or to configure the UE, according to the configuration parameter, and/or to indicate the related network function entity or node to configure, or to configure the related network function entity or node at the network side, according to the configuration parameter;

wherein the processor is configured:

to obtain a set of mobility states of the UE;

to determine whether the obtained set of mobility states of the UE is appropriate, according to a part or all of: a mobility limitation, a mobility model, a reachability requirement, and a capability of the UE; and to determine a set of Non-Access Stratum (NAS) mobility states of the network side upon determining that the obtained set of mobility states of the UE is appropriate; and after the determining the set of NAS mobility states of the network side, the processor is further configured:

to generate a Radio Resource Control (RRC) layer mobility state, or assist an access network node in determining a mobility state parameter, according to a part or all of the set of mobility states, the mobility limitation, or the mobility model, of the UE.

13. The network device according to claim 12, wherein the attribute of the UE further comprises any one or more of:

a capability of the UE;

a mobility attribute of the UE;

a session attribute of the UE; and a set of mobility states of the UE.

14. The network device according to claim 13, wherein:

the mobility attribute of the UE comprises a part or all of: the mobility limitation, the mobility model, and a reachability requirement; and the session attribute of the UE comprises a session type and/or a session continuity mode.

15. The network device according to claim 14, wherein the capability of the UE is a parameter characterizing any one or more of:

an operating mode supported by the UE;

an access technology supported by the UE; and a mobility state supported by the UE.

16. The network device according to claim 12, wherein the processor is configured:

to determine the mobility state allowed for the UE according to a part or all of: the mobility limitation, the mobility model, the reachability requirement, and the capability of the UE; and/or to determine the transmission tunnel type of the network side according to a part or all of: the mobility limitation, the mobility model, a session type, and a session continuity mode.

* * * * *